United States Patent [19]
Adachi et al.

[11] 3,779,739
[45] Dec. 18, 1973

[54] PROCESS FOR MANUFACTURE OF LOW OXYGEN AND LOW SULPHUR STEEL

[75] Inventors: Toshio Adachi; Kiyohide Hayashi, both of Nagoya, Japan

[73] Assignee: Daido Seiko Kabushiki Kaisha, Kuridashi, Nagoya-shi, Aichi-ken, Japan

[22] Filed: Dec. 22, 1970

[21] Appl. No.: 100,835

[30] Foreign Application Priority Data
Dec. 26, 1969   Japan.............................. 44/104331

[52] U.S. Cl................................ 75/12, 75/11, 75/94
[51] Int. Cl............................ C21c 5/52, C22b 9/10
[58] Field of Search..................... 75/10, 11, 94, 12, 75/49, 95, 51–55; 148/26

[56]         References Cited
           UNITED STATES PATENTS

| | | | |
|---|---|---|---|
| 3,547,622 | 12/1970 | Hutchinson............................. | 75/49 |
| 3,551,137 | 12/1970 | Bhat........................................ | 75/94 |
| 3,476,171 | 11/1969 | Stark....................................... | 75/95 |
| 3,152,372 | 10/1964 | Hopkins................................. | 75/10 |
| 3,417,808 | 12/1968 | Rosenberg............................. | 75/95 |
| 3,183,077 | 5/1965  | Kraus...................................... | 75/12 |
| 3,508,914 | 4/1970  | Buehler.................................. | 75/93 |
| 3,496,280 | 2/1970  | Dukelow................................ | 75/11 |
| 2,139,853 | 12/1938 | Rohn ...................................... | 75/11 |
| 3,347,766 | 10/1967 | Death ..................................... | 75/11 |
| 3,342,250 | 9/1967  | Treppschuh ......................... | 75/10 R |
| 3,160,497 | 12/1964 | Loung................................... | 75/10 R |
| 3,551,137 | 12/1970 | Bhat........................................ | 75/94 |
| 3,215,423 | 11/1965 | Taylor..................................... | 75/49 |

FOREIGN PATENTS OR APPLICATIONS

| | | | |
|---|---|---|---|
| 673,265 | 1952 | Great Britain.......................... | 75/10 |
| 979,583 | 1962 | Great Britain.......................... | 75/10 |

OTHER PUBLICATIONS

Duckworth & Hoyle, "Electroslag Refining," Pp. 39–40, (London, 1969).

*Primary Examiner*—Charles N. Lovell
*Assistant Examiner*—Peter D. Rosenberg
*Attorney*—Stevens, Davis, Miller & Mosher

[57]           ABSTRACT

A process for manufacturing low oxygen and low sulphur steel in plasma arc furnace with or without induction heating under the condition of inert gas and special flux.

3 Claims, No Drawings

PROCESS FOR MANUFACTURE OF LOW OXYGEN AND LOW SULPHUR STEEL

Low oxygen and low sulphur steel is generally melted and produced with an arc furnace as follows.

1. Compulsory Deoxidation Process:

Various oxidizers containing elements with strong affinity for oxygen, e.g., Ca-Si, Fe-Si, Si-Mn, Ca-Al, Ca-Mg-Al and Al, etc., are added to molten steel and stirring the molten steel. The direct deoxidation reaction, that is, $XM + yO \rightarrow M_xO_y$ is carried out and then oxidated materials (slag) are removed.

2. Diffusion Deoxidation Reaction:

Basic slag is prepared and oxygen distribution reaction is carried out between molten steel and the slag.

In this case, the agitation of molten steel and slag is a very important factor. Meanwhile, desulphurization reaction is generally done as follows.

Reducing slag which has high basicity is made and then desulphurization is done by sulphur distribution. In this case, too, the agitation of molten steel is an important factor in order to intimately contact slag and metal.

Various vacuum degassing equipment are sometimes used in order to facilitate a strong degassing reaction, and some oscillation laddle equipment and rocking convertors, which have a strong stirring power over molten steel and slag, are used in order to facilitate the desulphuring and deoxidation reaction. However, their installations are expensive, which make the molten steel expensive.

In the meantime, usually melting with high- or low-frequency induction furnaces are used only for remelting, so the use thereof requires selecting melting materials which must be low oxygen and low sulphur steel and 2 do not present any other special refining than deoxidation.

This invention relates to a process of manufacturing low-oxygen and low-sulphur clean steel which decrease non-metallic inclusions. According to the process of this invention cold charge is melted in a reduced pressure or under inert-gas atmosphere by induction heating, or that molten steel which is made in the other melting furnace is charged, and is heated by plasma arc with or without other heating sources, and then (O) and (S) in the molten steel are removed by adding special basic flux including CaO, $Al_2O_3$ and $CaF_2$ as main components together with alloying elements.

According to the present invention, induction heating insures the stirring of the molten steel and the basic refining agents, and the plasma arc and other heating sources, if necessary, are used to keep the desired temperature for refining molten steel.

Accordingly, the plasma arc furnace includes the induction coil and the iron core which cause a stirring by the interaction between the moving magnetic field and the eddy currents induced into the molten steel, the inside wall thereof is lined by alumina and magnesia or other refractories, the inside of the roof with hole is lined by alumina or other refractories, and the refining is possible in the vessel of the furnace which is sealed by inside wall and the roof specially designed.

Meanwhile, desulfuring reaction is promoted under the condition of high basidity and high fluidity of slag. Roles of CaO, $Al_2O_3$ and $CaF_2$ of special basic flux are as follows:

CaO contributes to increase the basicity of slag, but its melting point is very high, so $Al_2O_3$ and $CaF_2$ are added to increase the fluidity of slag.

According to the results of the experiments, the refining agents quickly become a solution if they are less than 5.0% for molten steel, more desirably 1.0 – 3.0% of CaO-$Al_2O_3$ flux (having the composition 30 – 60% of CaO, 20 – 40% of $Al_2O_3$ and less than about 20% of others) or 1.0 – 3.0% of CaO-$CaF_2$ flux (having the composition 40–70% of CaO, less than 20% of $CaF_2$ and less than about 30% of others), so that the strong surface reaction of metal and slag is taken through the strong stirring of molten steel, and then (O) and (S) in the molten steel decrease to remarkable lower level in a short time and low-oxygen and low-sulphur clean steel is made.

Table 1 shows the examples of the melting of carbon steel, bearing steel, stainless steel and tool steel.

TABLE 1

| Type of steel | Heat No. | Chemical analysis (percent) | | | | | | | (O) | Remarks |
|---|---|---|---|---|---|---|---|---|---|---|
| | | Carbon | Silicon | Manganese | Nickel | Chromium | Molybdenum | Sulphur | | |
| AISI 1050 | M6419 | 0.52 | 0.22 | 0.62 | 0.25 | 0.44 | 0.05 | 0.030 | 29 PPM | Refining flux used: |
| | | .50 | .17 | .62 | .27 | .44 | .05 | .002 | 18 | CaO-$Al_2O_3$. |
| | | | | | | | | (93) | (38) | Slag ratio: 3.0%. |
| | | | | | | | | | | Refining time: 30 minutes. |
| | | | | | | | | | | Atmosphere: $N_2$–gas. |
| AISI 52100 | M6422 | 1.03 | .26 | .58 | .11 | 1.38 | | .040 | 20 | Refining flux used: |
| | | 1.02 | .26 | .60 | .10 | 1.38 | | .004 | 13 | CaO-$CaF_2$. |
| | | | | | | | | (90) | (35) | Slag ratio: 3.0%. |
| | | | | | | | | | | Refining time: 30 minutes. |
| | | | | | | | | | | Charged 1.0% of refining flux for cold material in the furnace and then melted them. |
| Equivalent to AISI 4118*. | M6425 | .22 | .28 | .70 | .08 | 1.00 | .17 | .024 | 41 | Refining flux used: |
| | | .23 | .26 | .70 | .08 | 1.00 | .17 | .005 | 19 | CaO-$CaF_2$. |
| | | | | | | | | (79) | (54) | Slag ratio: 2.0%. |
| | | | | | | | | | | Refining time: 30 minutes. |
| | | | | | | | | | | Atmosphere: Ar–gas. |
| AISI 440C | M7414 | 1.02 | .51 | .52 | .09 | 16.98 | .38 | .022 | 61 | Refining flux used: |
| | | 1.03 | .50 | .52 | .08 | 17.00 | .39 | .005 | 18 | CaO-$Al_2O_3$. |
| | | | | | | | | (77) | (71) | Slag ratio: 3.0%. |
| | | | | | | | | | | Refining time: 15 minutes. |
| | | | | | | | | | | Not metal charged which was prerefined with the Arc-furnace atmosphere: Ar–gas. |

TABLE 1—Continued

| Type of steel | Heat No. | Carbon | Silicon | Manganese | Nickel | Chromium | Molybdenum | Sulphur | (O) | Remarks |
|---|---|---|---|---|---|---|---|---|---|---|
| AISI 304L | M7417 | .01 | .45 | 1.50 | 9.50 | 19.00 | | .030 | 50 | Refining flux used: $CaO-Al_2O_3$. |
| | | .01 | .45 | 1.50 | 9.50 | 19.00 | | .003 | 19 | Slag ratio: 3.0%. |
| | | | | | | | | (89) | (62) | Refining time: 20 minutes. Atmosphere: Ar—gas. |
| (Tool Steel).*1 | M9403 | .40 | 1.00 | .35 | .08 | 3.29 | 2.60 | .020 | 20 | Refining flux used: $CaO-CaF_2$. |
| | | .40 | .97 | .37 | .09 | 3.30 | 2.61 | .004 | 12 | Slag ratio: 3.0%. |
| | | | | | | | | (80) | (40) | Refining time: 20 minutes. Atmosphere: $N_2$—gas. |

NOTE: the figure in the Table
· upper: before charging the refining flux; lower: after charging the refining flux.
· the figure in ( ): the ratios of deoxidation and desulfurization.
*1 JIS: SCM22.

As shown in the table, any kind of steel from cold scrap or prerefining become to a steel having approx. ranging 0.03 – 0.04% of S. This table also shows that after the basic refining agents including CaO, $Al_2O_3$ and $CaF_2$ as main components are added, desulphuring is reached to 0.002 – 0.005% of S only within 15 – 30 minutes, and that the quantity of oxygen is also remarkably decreased compared with that before the addition of the refining flux and is the same or less than the case melted with a vacuum refining.

The refining flux written above was used in the pulverized particles but it is confirmed that the refining flux is effective also in the liquid condition by the arc heating.

The steel produced in this invented method was improved in tensile properties, hot and cold forming properties, corrosion resistant properties and so on.

What we claim is as follows:

1. A process for manufacturing low oxygen and low sulfur steel by deoxidation and desulphurization refining comprising charging a molten steel in a plasma arc furnace provided with an induction coil which surrounds the furnace body and adding from 1 to 5 percent by weight of a basic flux selected from the group consisting of (1) flux comprising from 30 to 60% by weight of CaO from 20 to 40% by weight of $Al_2O_3$ and less than 20% weight of other oxides and (2) flux comprising 40 to 70% by weight of CaO, less than 20% by weight of $CaF_2$ and less than 30% by weight of other oxides to the molten steel to provide a layer of molten flux on the molten steel, heating said molten steel with the plasma arc while circulating the molten steel under the molten flux layer by means of induction current from the induction coil so as to promote contact of the molten steel with the molten flux under an inert gas atmosphere of normal pressure generated by the plasma arc jet.

2. A process according to claim 1, wherein said basic flux is added in an amount of from 1 to 5% by weight of said molten steel.

3. A process according to claim 2, wherein said basic flux is added in an amount of from 1 to 3% by weight of said molten steel.

* * * * *